P. CAUHAPÉ.
Cigar-Package.

No. 201,160. Patented March 12, 1878.

UNITED STATES PATENT OFFICE.

PIERRE CAUHAPÉ, OF NEW YORK, N. Y.

IMPROVEMENT IN CIGAR-PACKAGES.

Specification forming part of Letters Patent No. 201,160, dated March 12, 1878; application filed November 27, 1877.

*To all whom it may concern:*

Figure 1:
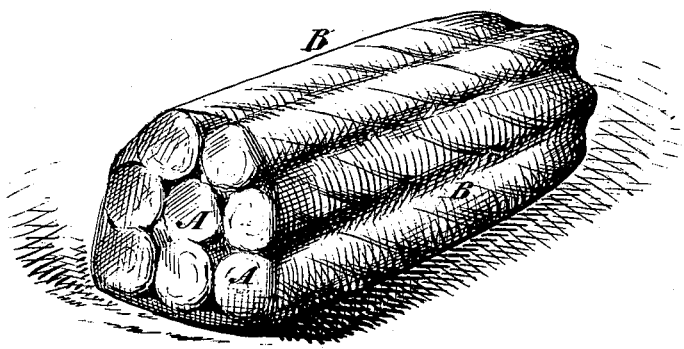
Figure 2:
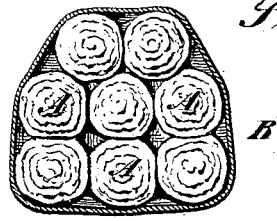

Be it known that I, PIERRE CAUHAPÉ, of the city, county, and State of New York, have invented a new and Improved Cigar-Package, of which the following is a specification:

In the accompanying drawings, Figure 1 represents a perspective view of my improved cigar-package, and Fig. 2 a vertical transverse section of the same.

Similar letters of reference indicate corresponding parts.

The object of this invention is to so pack cigars, especially Havana, and other cigars of better quality, that their peculiar flavor and original degree of moisture are retained for any length of time, in hot or cold seasons or climates. The cigars are thereby preserved, and may be smoked whenever they are taken out of the package, as if in fresh original state.

Referring to the drawings, A represents a bundle of cigars, of small or large size, which is inclosed by an envelope or capsule, B, of air-tight and moisture-proof material. The capsule B is made of two parts, the main part being formed in a mold of the size of the bundle, the cigars being then inserted, and the closing part finally applied to the main part. The capsule B may be preferably made of a mixture of gelatine, honey, and gum-arabic, which has a large degree of flexibility without being liable to be affected by the temperature and get brittle in hot weather, as gelatine. The envelope or capsule may be molded into any fanciful shape, according to the purposes desired.

When the capsule is properly finished, the joint of the parts will not be noticeable, and the cigars be readily seen through the transparent covering. If a whole box is to be made up in such a covering, the interior may be coated with the solution, the cigars put in, and a closing top sheet jointed to the top edges of the box, so as to form thus a hermetically-closed and moisture-proof envelope.

The better qualities of cigars may, in this manner, be shipped to any part of the world, and stored for any length of time without being liable to deterioration, as the original moisture and flavor are fully retained.

When it is desired to smoke one of the cigars, the envelope is opened and the cigars removed therefrom, which is easily done, as the capsule does not adhere to the same.

By this mode of packing, manufacturers of Havana and similar cigars may furnish their cigars in such a manner that their special quality and flavor are preserved, and a superior article for smokers at any time or place provided.

Having thus described my invention, I claim as new and desire to secure by Letters Patent—

A cigar-package inclosed by a separate but hermetically-sealed and moisture-proof envelope or capsule of gelatinous material, substantially as and for the purpose set forth.

PIERRE CAUHAPÉ.

Witnesses:
 PAUL GOEPEL,
 C. SEDGWICK.